United States Patent [19]
Dieges

[11] 3,844,262
[45] Oct. 29, 1974

[54] VAPORIZATION OF EXHAUST PRODUCTS IN HYDROGEN-OXYGEN ENGINE

[76] Inventor: Paul Bertrand Dieges, 1051 Davids Rd., Perris, Calif. 92370

[22] Filed: June 20, 1973

[21] Appl. No.: 371,675

Related U.S. Application Data

[63] Continuation-in-part of Ser. No. 79,473, Oct. 9, 1970.

[52] U.S. Cl....... 128/119 A, 123/1 A, 123/DIG. 12, 123/119 E
[51] Int. Cl............................ F01k 17/02, F01f 3/20
[58] Field of Search......... 123/119 E, 1 A, DIG. 12, 123/119 A

[56] References Cited
UNITED STATES PATENTS

| | | | |
|---|---|---|---|
| 3,101,592 | 8/1963 | Robertson et al. | 123/DIG. 12 |
| 3,362,883 | 1/1968 | Wright | 123/DIG. 12 |
| 3,459,953 | 8/1969 | Hughes et al. | 123/DIG. 12 |
| 3,471,274 | 10/1969 | Quigley, Jr. et al. | 123/DIG. 12 |
| 3,608,660 | 9/1971 | Smith et al. | 123/DIG. 12 |

Primary Examiner—Wendell E. Burns

[57] ABSTRACT

An open cycle internal combustion engine, uses in combination oxygen and hydrogen burned as fuel in the combustion chamber after being mixed with a surplus gas, and has a substantially closed system which recirculates the surplus gas through the system for reuse and expels only the water of combustion to the atmosphere. Heat exchangers and a trap separates the water of combustion from the surplus gas by liquifing the water vapor contained in the engine's exhaust. Hot engine exhaust is initally cooled by heat exchange contact with the separated water and said separated water is simultaneously warmed to vapor by the exchange of heat before expelling the vapor to the atmosphere. The surplus gas is then reused with fresh supplies of hydrogen and oxygen. Throttle valves are adjusted to vary the quantity of oxygen and hydrogen for speed control and at the same time maintain a proper proportioning of the gases at whatever quantity may be established for a selected speed.

4 Claims, 3 Drawing Figures

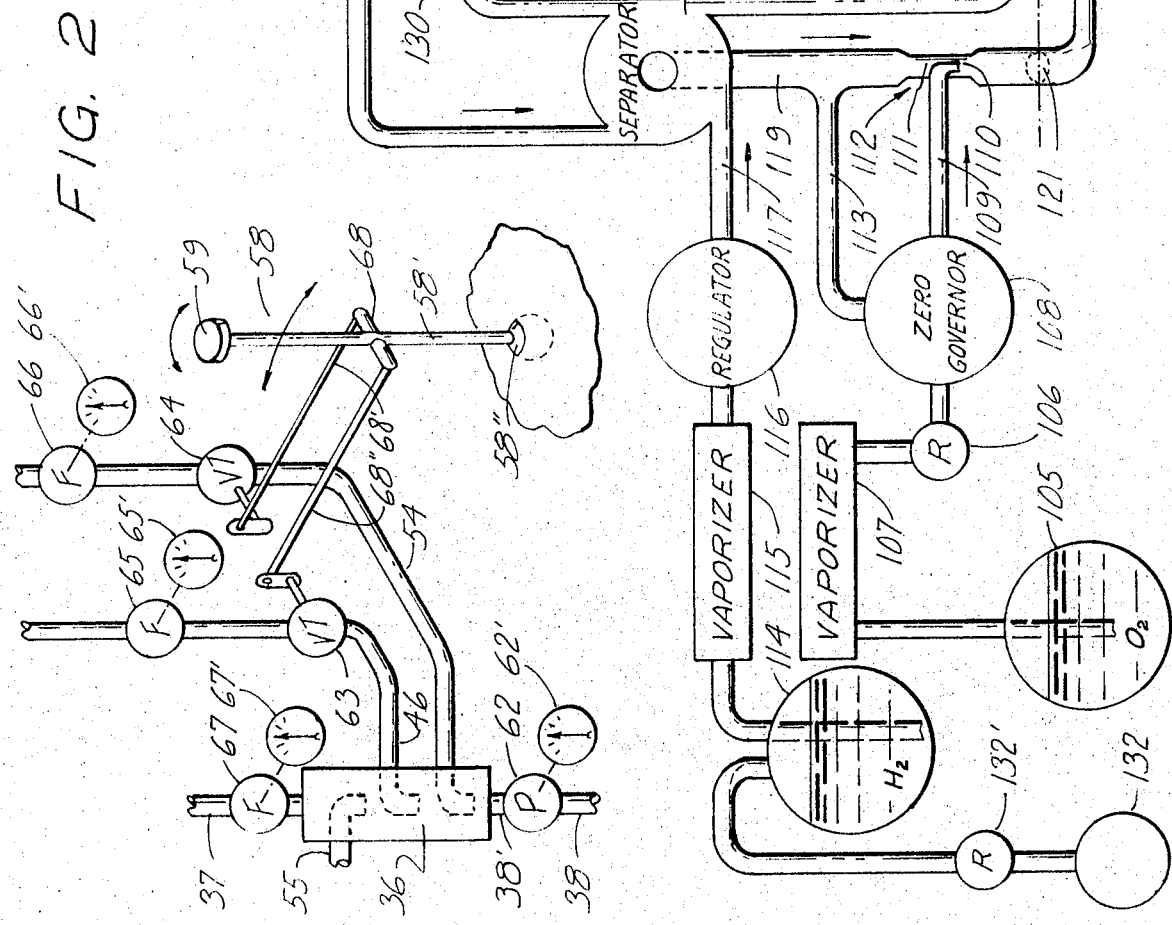

3,844,262

VAPORIZATION OF EXHAUST PRODUCTS IN HYDROGEN-OXYGEN ENGINE

This is a continuation-in-part of the copending application, Ser. No. 79,473, filed Oct. 9, 1970.

The object of the invention is to eliminate completely all pollutants from the system exhaust of a conventional internal combustion engine without the necessity of modifying the basic engine design.

Exhaust pollutants from internal combustion engines fueled by hydrocarbons and using air as an oxidizer consist of fuels not fully oxidized, oxides of nitrogen, carbon monoxide and various chemicals formed in the cylinder by reaction of the fuel additives with the oxygen and nitrogen of the air within the high pressure, high temperature and electric arc present in the environment of the normal otto cycle engine common to current automotive propulsion systems. Although carbon dioxide is produced by humans and animals, internal combustion engines fueled by hydrocarbons produce carbon dioxide at a rate sufficiently great to be considered a pollutant. Water is also produced by engines fueled by hydrocarbons, but is not considered a pollutant.

In the invention here disclosed, hydrogen and oxygen are used as fuel so that water is the only product of combustion and thus is not a pollutant. In this example, removal of water of combustion from the system is accomplished by passing the engine exhaust, consisting of a mixture of water vapor, miscellaneous gases and partially or fully oxidized elements, through a condenser and a separator to remove the liquid water from the cooled engine exhaust and then returning the remaining gaseous portion of said mixture to the intake manifold of the engine. The separated water is warmed to a higher temperature, or may be vaporized, by heat exchange relationship with the engine's exhaust before being discharged into the atmosphere.

The remaining gaseous portion is mixed with a stoichiometric quantity of new hydrogen and oxygen sufficient to regulate the engine speed to the desired amount. The blowby gases which escaped past the seals between the crankcase and the combustion chamber, into the crankcase, consisting mostly of said miscellaneous gases, but having some hydrogen, oxygen, water vapor, lubricating oil vapor, and miscellaneous other substances, are also mixed with the remaining gaseous portion. This mixture is then introduced into the engine intake for normal combustion and subsequent exhausting from the engine to complete the recirculation cycle. Miscellaneous gases refered to in this forgoing description, which were initially introduced into the system by conventional means before the engine was started and remain in place until the system is disassembled for any reason, can be an inert gaseous component, hydrogen only, oxides of nitrogen, carbon dioxide, or other gas or combination of gases suitable to keep the flame speed and combustion temperatures within the limits necessitated by the design of the conventional air-hydrocarbon fueled engines converted to this system. Said miscellaneous gas also provides an expansion medium.

Among the objects of the invention is to provide a new and improved fuel cycle for an internal combustion engine which will substantially eliminate the exhaust of substances commonly identified as pollutants to the atmosphere. Still another object of the invention is to provide a new and improved fuel system for an internal combustion engine in which the only exhausted component is water which is in vapor form or at a temperature above that at the discharge point of the separator. Still another object of the invention is to provide a new and improved fuel system for an internal combustion engine which improves the quietness of operation of the engine, which eliminates the need for muffler and carburetor and which, when the miscellaneous gas is hydrogen, avoids the formation of acid in the engine oil. Additionally included among the objects of the invention is to provide a new and improved fuel system for a combustion engine wherein, by use of hydrogen and oxygen in liquid state as a source of energy, makes possible employment of the system as a cooling expedient to take the place of the conventional air conditioning device, and provide a cooling air conditioner for such vehicle as may be operated by use of the system.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 2 is a manual control for operation of the invention.

FIG. 3 is another form of the invention showing a different means for controlling engine speed.

Figure 1:
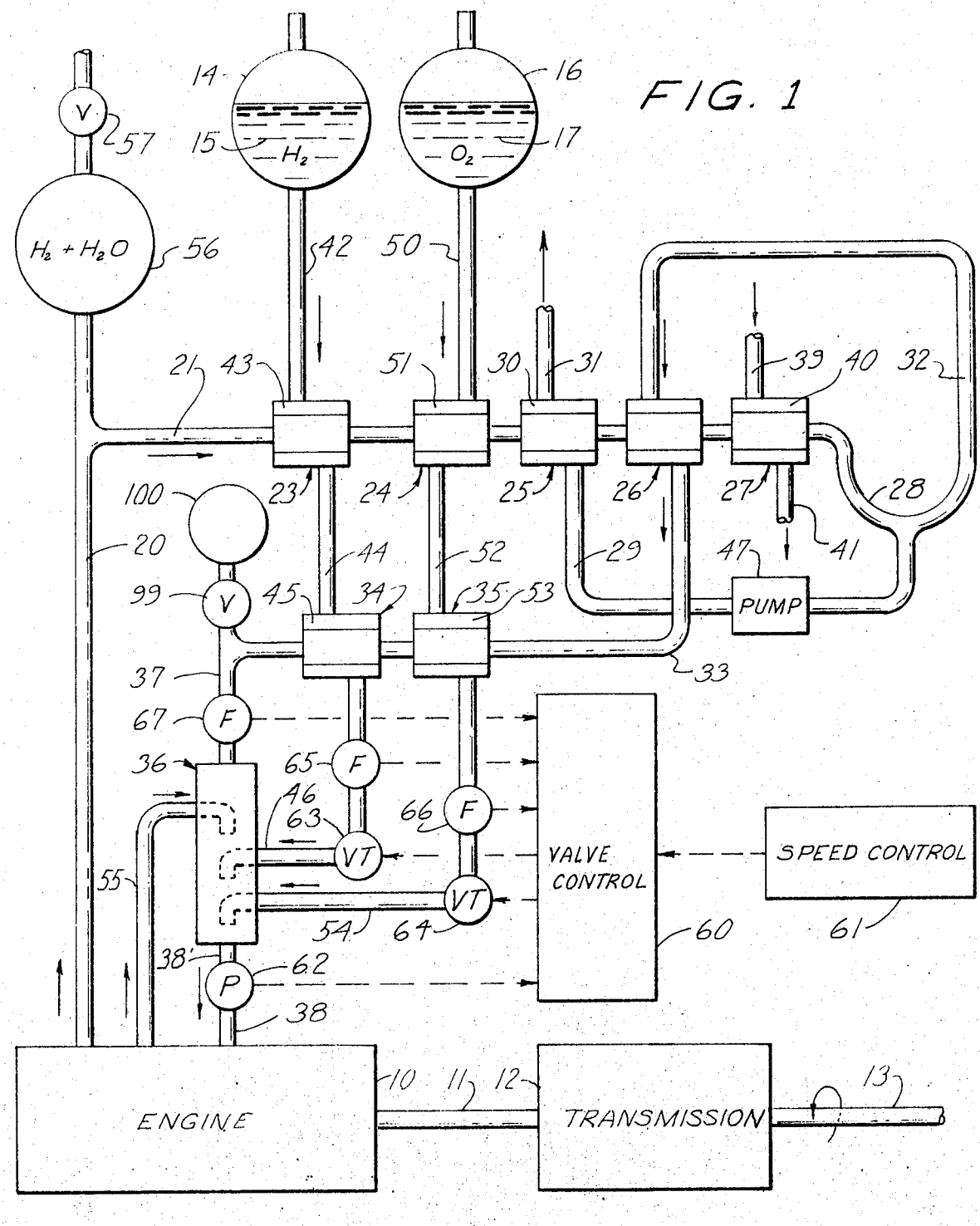
FIG. 1 is a schematic representation of one form of the fuel system which contemplates employment of hydrogen and oxygen in liquid state.

In the embodiment of the invention shown in FIG. 1, chosen for the purpose of illustration, there is shown a substantially conventional internal combustion engine, which has one or more combustion chambers which vary in volume and pressure in a cyclic manner to produce work, an intake to admit a combustable charge, a means to ignite the combustable charge, an exhaust to remove the combusted charge, means to seal the combustion chamber from the crankcase, and means to cyclically seal the combustion chamber's exhaust and intake, indicated by the reference character 10, which, acting through shaft 11 and transmission 12, is adapted to operate a drive shaft 13.

Fuel for the engine is contained in reservoirs 14 and 16, respectively adapted to contain a quantity of liquid hydrogen 15 and liquid oxygen 17.

Inasmuch as recirculation of a surplus gas for reuse, initially introduced into the system, is an important phase of the system, attention is initially directed to an engine exhaust line 20 and its extension 21, which is served by a series of heat exchangers 23, 24, 25, 26, & 27 to cool the engine exhaust and condense the water vapor contained therin, at the end of which is a water separating device in the form of a trap 28 also designed to prevent the escape of the surplus gas from the system. Inasmuch as the fuel for the engine is a mixture of hydrogen and oxygen, the product of combustion in the exhaust is water which, in view of the series of heat exchangers, is converted to liquid and which, by operation of trap 28, is separated out, passed through a liquid water line 29 to the outer jacket 30 of heat exchanger 25, where the liquid water is raised in temperature by the hot exhaust before the hot exhaust is further cooled by the primary heat exchanger 27. The heat exchanger 25 is of a design selected to raise the temperature of the liquid water to a point below, at, or above the boiling point of the water before it is discharged to the atmosphere. However, the more heat that is added to the water by heat exchanger 25, the less the load will be on primary heat exchanger 27.

Since the system is designed and adapted to operate with a surplus of a selected gaseous ingredient, which is part of the engine exhaust mixture, a surplus gas return 32 leading from the trap 28 passes through the outer jacket of the heat exchanger 26 on its way to a pipe 33 and ultimately back to the engine 10.

More specifically, the surplus gas, carried in pipe 33, is directed through two additional heat exchangers 34 & 35 designed to bring the surplus gas and the fuels to substantially the same temperature and then enters a mixer 36 by way of a pipe 37. An intake manifold 38 receives fuel gas from a pipe 38' at the outlet of the mixer and passes it to the engine 10.

The heat exchanger 27, serving as a condenser and previously identified as being located in the extension 21 of the exhaust line, may be a substantially conventional heat exchanger or, for example, a radiator of the type commonly used on automotive vehicles, surrounded by a jacket, which is part of said extension 21, capable of circulating cooling water through an inlet 39 and then through tubes 40 to an outlet 41.

Since liquid hydrogen and liquid oxygen respectively in the reservoirs 14 and 16 tend to emerge in cold condition from the reservoirs, it is desirable to warm these fuels before they reach the mixer 36 and are injected into the engine. To accomplish this, a pipe 42 from the hydrogen reservoir 14 communicates with a jacket 43 of the heat exchanger 23 and is warmed by the heat of the engine exhaust. A pipe 44 from the jacket 43 communicates with a jacket 45 of the heat exchanger 34 where the hydrogen is warmed additionally by heat which remains present in the surplus gas returning through pipe 33, action of the heat exchangers 23 and 34 thereby serving to convert liquid hydrogen into gaseous hydrogen before it passes through a supply pipe 46 to the mixer 36.

Similarly, a pipe 50 from the oxygen reservoir 16 passes liquid oxygen to a jacket 51 of the heat exchanger 24 from which is flows through a pipe 52, converted into gaseous form, to a jacket 53 of the heat exchanger 35. From the jacket 53 oxygen passes through a supply pipe 54 on its way to the mixer 36 and ultimately to the engine 10.

To complete the circuit there is provided a blowby exhaust line 55 which accepts exhaust from the crankcase of the engine and passes it to the mixer 36. It follows therefore that the mixer 36 receives gaseous components from several different sources, namely the blowby exhaust, the surplus gas return, and the fresh fuel supplies of oxygen and hydrogen wherein all are mixed before being passed to said intake of the combustion engine 10, to be compressed, ignited, and expanded in the conventional manner to produce work.

In the engine exhaust line 20 is an accumulator 56 equipped with a relief valve 57 to prevent overpressuring of the system.

Because of inherent differences in flow rates of hydrogen and oxygen upon changes in demand, it is advantageous to make use of an automatic valve control 60 responsive jointly to a speed control 61 and a pressure gauge 62 at the intake manifold in controlling throttle valves 63 and 64 respectively in the hydrogen supply pipe 46 and oxygen supply pipe 54, thereby to control the quantity of oxygen fuel and hydrogen fuel being introduced to the mixer 36 and, in consequence, to control the speed of the engine. The speed control may, if desired, be entirely manual.

Flow meter 65 in the hydrogen supply line 46 and flow meter 66 in the oxygen supply line 54 are connected to the automatic valve control 60. A flow meter 67 in the pipe 37 returning surplus gas to the mixer 36 is similarly connected to the automatic valve control 60.

The purpose of flow meters 65, 66, & 67, of conventional construction, is to provide the valve control 60 with information indicating the rate of flow in the respective pipes so that it can maintain a net volumetric supply of 2 parts hydrogen to 1 part oxygen through, respectively, lines 46 & 54. Related information is provided by the pressure gage 62 to the flow meter giving pressure at the intake manifold. By a conventional integrating system, not part of the present invention, the valve control 60, when activated by the speed control 61 at the volition of the operator, mechanically operates the flow controls 63 and 64 in either an opening direction for speed up of the system or in a closing direction for lessening speed. Equivalent operation can be achieved by manual manipulation of the flow controls directly by the speed control.

On those occasions where the surplus gas initially introduced into the system is hydrogen, its proportion in the combustable charge varies from its upper flamability limits of 92 percent Hydrogen (11.5:1 ratio) during idling to approximately 80 percent Hydrogen (4:1 ratio) during accelleration. On those occasions where the surplus gas is one of the other suggested gasses, said surplus will vary from about 80 percent to 50 percent of the combustable charge depending whether the engine is idling or producing maximum power. On either occasion lesser percentages of the surplus gas will cause engine damaging effects due to high temperatures and knocking. Also on either occasion the surplus gas may occupy 100 percent of the system's volume during decelleration as there is no need for combustion to occur.

A surplus gas, such as argon or one of the other suggested gases, may be initially introduced into the system or a surplus gas of any selected kind may be added later to the system by injecting it into an opening made in any of the systems passageways. Alternately, the gas may be injected at pipe 37 through valve 99 when it is opened to admit the desired surplus gas, which is supplied by container 100. The gas which was in the system will then be purged out through the check valves in the pumps in the liquid water line 29, and, if necessary, out through other openings temporarily made in the system to obtain complete purging.

A pump 47 in the liquid water line 29 pumps water in liquid form to heat exchanger 25.

During the acceleration mode, surplus gas and water vapor are stored in the accumulator 56 until constant speed is reached, or the deceleration mode has started. The relief valve 57 will vent excess pressures developed in the accumulator by system operation as has been previously noted.

As an example of manual control of the quantity of oxygen and hydrogen to the manifold to change engine speed, reference is made to FIG. 2. As there shown, a battery of indicators reveal visually the flow conditions at various locations at any given instant. An indicator 67' is connected to the flow meter 67, an indicator 65' to the flow meter 65 and an indicator 66' to the flow meter 66. Pressure information is visually revealed by use of an indicator 62' connected to the pressure gage 62.

A speed control throttle lever 58 has an arm 58' on a universal mounting 58''. A cross bar 68 has one end attached to a link 68' for manipulation of the throttle valve 64 for oxygen and the other end attached to a link 68'' for manipulation of the throttle valve 63 for hydrogen. A handle 59 on the arm 58' may be thrown forewardly or rearwardly to open or close both throttle valves simultaneously thereby to alter the speed of the engine. At the same time the handle 59 may be rotated to vary the relative openings or closings of the throttle valves.

The speed control 58 is manipulated so that the proportion of fresh fuels remain at a ratio of 2 parts hydrogen to 1 part oxygen, by volume, as delivered to the mixer 36. Because the flow rates through the throttle valves 63 & 64 vary with demand due to the widely different molecular weights of hydrogen and oxygen, the amount of opening of the control throttle 63 relative to the amount of opening of the control throttle 64 needs to be changed.

As a guide to the operator in adjusting the manual settings the indicators 66', 65' and 67' respectively constantly supply a visable indication of flow in the oxygen and hydrogen in the supply lines 52 and 44 respectively, and also flow in the surplus gas return line 37. As a safety feature the indicator 62' shows the pressure at the manifold at a point where all gaseous components have been combined. This is a warning as to how rapidly or slowly changes in quantity flow, and accordingly speed control, should be made.

The invention in the form illustrated in FIG. 3 exemplifies an alternative expedient for introducing oxygen under control to the system at a location such that the speed control of a standard internal combustion engine can be governed by a simple butterfly valve. The surplus gas, initially introduced into the system in this form of the invention, by way of example, is hydrogen with only unavoidable traces of other gases.

The system emodies a container 105 of liquid oxygen held under a pressure of about 80 pounds per square inch. Oxygen from the container passes through a vaporizer 107 to a conventional regulator 106 where the pressure is lowered to 10 pounds per square inch at ambient temperatures. From here the oxygen passes to a governor 108 designed to remain closed until a vacuum is created in supply line 109 by the gas flow through venturi 112, and to open in proportion to the vacuum's magnitude. From the governor, oxygen passes through a supply line 109 to an aspirator 110 at the throat 111 of a venturi 112. A pressure reference line 113 provides a connection from the intake side of the venturi 112 to the governor 108.

In this form of the invention, by way of example, hydrogen in liquid form is supplied from a container 114 at 10 pounds per square inch pressure to a vaporizer 115 and then to a regulator 116. The purpose of the regulator is merely to be certain that the hydrogen is at a pressure of about ¼ pound per square inch higher than ambient. As hydrogen is used, by combustion with the oxygen, and the resultant water is removed from the system, the pressure drops, causing the regulator 116 to open and supply fresh hydrogen to the system in the stoichiometric ratio to the oxygen that was supplied to the system. From the regulator, hydrogen passes into the system through a hydrogen supply line 117, to a separator 118, from which a pipe 119 passes the hydrogen to the entrance end of the venturi 112. Hydrogen, mixing with oxygen in the throat of the venturi at a constant ratio substantially greater than the stoichimetric ratio, passes to the outlet end of the venturi and then through a combined conduit 120 in which is located a conventional speed control of the butterfly type 121. From the conduit 120 the gaseous mixture flows to an intake 122 of the conventional combustion engine 123 where the mixture is compressed, ignited, and expanded to perform work, in a conventional manner. Said constant ratio of hydrogen to oxygen being about 6:1 by volume. Other ratios productive of acceptable results range from 4:1 to 24:1 (the upper flamability limit). Ratios closer to 2:1 (stoichiometric) will damage the engine. Whatever ratio is selected, before the engine is started, will remain constant throughout the operating cycle in this form of the invention.

A conventional engine exhaust is exemplified by a combined passageway 124 from which the exhaust, which is a mixture of water in either steam or moist condition together with surplus hydrogen, travels to heat exchanger 139 where the exhaust gases are initially cooled as they pass through jacket 137. The exhaust gases then continue through line 124' to a condenser 125 where the water is condensed and partially separated from the surplus hydrogen remaining from the engine's combustion process due to the insufficient oxygen. Water is drawn through a pipe 126 by pump 127 and then passed through a discharge line 128' to heat exchanger 139 where it is raised in temperature and vaporized in passageway 138 before being discharged through line 128 to the atmosphere.

The surplus hydrogen, which is in appreciable volume, passes from the condenser 125 through a pipe 129 to the separator 118. The function of the separator is merely to extract any water which may remain present in the surplus hydrogen, such water as may be extracted being discharged through a pipe 130 by means of a pump 131 and from there passed to the discharge line 128' where it joins the water initially separated out of the condenser 125.

The surplus hydrogen from which the water has been extracted by the separator 118 is mixed with fresh hydrogen from said hydrogen supply line 117 and then passed into pipe 119 to complete the circuit.

To assist in discharging the hydrogen at the desired rate, use may be made of hellium, held at a storage pressure of 2,000 pounds per square inch, in a container 132, which, after passing through a conventional regulator 132', is used to displace hydrogen in the hydrogen container 114. The hellium takes no part in the reaction nor in the system otherwise.

For operating the condenser 125 use is made of a conventional automobile radiator 133 through which a fan 134 draws air, and a coolant pump 135 circulating coolant, which may be water, through the condenser 125 to condense out the water as previously noted. The coolant then passes to the combustion engine for cooling the engine in a purely conventional fashion, and then back to the radiator 133.

Crankcase blowby vapors are carried through a blowby exhaust line 136 to the separator 118 and the blowby gas joins the surplus hydrogen in the separator as it joins the fresh hydrogen as previously described. Should there be any water vapor present in the blowby gases, such water will be separated from the gases by operation of the separator 118.

Basically, the system of FIG. 3 operates in substantially the same fashion as has been described for FIG. 1 and the other forms of the invention. It should be born in mind that the principle of operation of the system of FIG. 3 is the maintenance, through reuse, of a superabundance of hydrogen and possible traces of other gases as the surplus gas, and varying the flow rate, by use of speed control butterfly valve 121, of a constant ratio of hydrogen to oxygen, as fixed by the geometry of the venturi and thus regulating the speed and power of the engine, whereas the principle of operation of the system of FIGS. 1 and 2 is the maintenance, through reuse, of a surplus of any selected gas or gases, and varying the ratio of the surplus gases to the fuels either automatically or manually, while the fuel hydrogen and fuel oxygen remain at their stiochiometric ratio, and thus regulate the speed and power of the engine. The principle common to all forms illustrated is the use of the condensed water in heat exchange relationship with the engine's exhaust, to assist the condenser in lowering the temperature of said exhaust, so that the surplus gas, gases or hydrogen may be more easily separated for reuse. The surplus gas or gases are always present throughout the system of both forms of the invention except in the supply lines of fuel oxygen and fuel hydrogen. Blowby is retained in the system so that the only waste product of the system expelled to the atmosphere is water, which is not an atmospheric pollutant.

No special tailpipe is needed since the exhaust is not toxic. No muffler is needed because the exhaust sound level is low resulting in little more than a slight rushing sound.

In all forms of the invention operation is begun in a substantially conventional fashion by cranking the engine thereby to create sufficient suction to draw the combustion fuel and surplus gas into the engine where ignition is effected at the proper time.

While the invention has herein been shown and described in what is conceived to be a practical and effective embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In an open cycle internal combustion engine, which has one or more combustion chambers in which the pressure and volume varies in a cyclic manner to produce work, an intake to admit a combustible charge, a means to ignite the combustible charge, an exhaust to remove the combusted charge, a means to seal the combustion chamber from the crankcase, and a means to cyclically seal the combustion chamber's intake and exhaust, a fuel system comprising a mixing passage and conduit means from said mixing passage to said intake, a first source of gas comprising oxygen as a fuel, a supply line and a throttle valve therein, from said first source to the mixing passage, a second source of gas comprising hydrogen as a fuel, a supply line and a throttle valve therein, from said second source to the mixing passage, the ratio of gases of the types supplied from said first and second sources is at the stoichiometric ratio of said gases, a surplus gas filling the various passageways of the system which when combined with the gases from said first and second sources in said mixing passage forms said combustible charge, a passageway for said surplus gas and water of combustion from said exhaust to a water separating device in said passageway, said water separating device is comprised of a condenser and a trap, adapted to liquify said water of combustion, and to separate said surplus gas from said water of combustion, a surplus gas return line for said surplus gas leading from said water separating device to said mixing passage to maintain said surplus gas in the system, a liquid water line from said water separating device to a heat exchanger, said heat exchanger being in heat exchange relationship between said liquid water line and said passageway and being designed to raise the temperature of said liquid water to a point below boiling, and a liquid water discharge line from said heat exchanger open to the atmosphere.

2. A fuel system as in 1 wherein there is a pump in said liquid water line acting in a direction to drive said liquid water to said heat exchanger.

3. In an open cycle internal combustion engine, which has one or more combustion chambers in which the pressure and volume varies in a cyclic manner to produce work, an intake to admit a combustible charge, a means to ignite the combustible charge, an exhaust to remove the combusted charge, a means to seal the combustion chamber from the cramkcase, and a means to cyclically seal the combustion chamber's intake and exhaust, a fuel system comprising a mixing passage and conduit means from said mixing passage to said intake, a first source of gas comprising oxygen as a fuel, a supply line and a throttle valve therein, from said first source to the mixing passage, a second source of gas comprising hydrogen as a fuel, a supply line and a throttle valve therein, from said second source to the mixing passage, the ratio of the gases of the types supplied from said first and second sources is at the stoichiometric ratio of said gases, a surplus gas filling the various passageways of the system which when combined with the gases from said first and second sources in said mixing passage forms said combustible charge, a passageway for said surplus gas and water of combustion from said exhaust to a water separating device in said passageway, said water separating device is comprised of a condenser and a trap, adapted to liquify said water of combustion and to separate said surplus gas from said water of combustion, a surplus gas return line for said surplus gas leading from said water separating device to said mixing passage to maintain said surplus gas in the system, a liquid water line from said water separating device to a heat exchanger, said heat exchanger being in heat exchange relationship between said liquid water line and said passageway and being designed to raise the temperature of said liquid water to a point above boiling, and a water vapor discharge line from said heat exchanger open to the atmosphere.

4. A fuel system as in 3. wherein there is a pump in said liquid water line acting in a direction to drive said liquid water to said heat exchanger.

* * * * *